June 13, 1950  E. N. DINGLEY, JR  2,510,964
RADIO BEACON SYSTEM
Filed Sept. 27, 1945

Inventor
EDWARD N. DINGLEY JR.
By Ralph L. Chappell
Attorney

FIG. 3    EDWARD N. DINGLEY JR.

June 13, 1950     E. N. DINGLEY, JR     2,510,964
RADIO BEACON SYSTEM Filed Sept. 27, 1945     6 Sheets-Sheet 3

FIG. 4

Inventor
EDWARD N. DINGLEY JR.
By Ralph W. Chappell
Attorney

June 13, 1950  E. N. DINGLEY, JR  2,510,964
RADIO BEACON SYSTEM
Filed Sept. 27, 1945  6 Sheets-Sheet 4

FIG. 5

Inventor
EDWARD N. DINGLEY JR.
By Ralph L. Chappell
Attorney

June 13, 1950

E. N. DINGLEY, JR 2,510,964

RADIO BEACON SYSTEM

Filed Sept. 27, 1945

Inventor
EDWARD N. DINGLEY JR.
By Ralph L. Chappell
Attorney

June 13, 1950 E. N. DINGLEY, JR 2,510,964
RADIO BEACON SYSTEM
Filed Sept. 27, 1945 6 Sheets-Sheet 6

FIG. 7

Inventor
EDWARD N. DINGLEY JR.
By Ralph L. Chappell
Attorney

Patented June 13, 1950

2,510,964

UNITED STATES PATENT OFFICE 2,510,964

RADIO BEACON SYSTEM

Edward N. Dingley, Jr., United States Navy

Application September 27, 1945, Serial No. 618,998

11 Claims. (Cl. 343—106)

(Granted under the act of March 3, 1883, as amended April 30, 1928; 370 O. G. 757)

My invention relates to a radio beacon system enabling the determination of the bearing existing between a remote receiving station and the transmitting beacon.

It is frequently necessary for surface and aircraft to be at all times informed of the bearing of a transmitting beacon station as a known point of geographic reference. Such information enables the craft to set an accurate course for the beacon station or to proceed to any other desired point whose location is known with respect to such beacon. A common way of obtaining such information is by means of a direction finder. Direction finders have a disadvantage of limited accuracy since in general the "null" position of the rotatable loop element is not well defined. In order to increase the accuracy, it has been necessary to increase the size and precision of the direction finder equipment.

In general, my invention resides in a method and means for determining bearing information using standard communication equipment to receive beacon signals.

My invention also includes the concept of utilizing a standard communications receiver in conjunction with simple direction finder equipment whereby the conventional direction finder equipment is used for approximate determination of bearing while the beacon signal received by the communications receiver is used to provide accurate bearing information.

Further in accordance with my invention, the transmitted bearing signals may be coded in a predetermined manner to provide security from interpretation and use by a non-authorized receiving station.

Also in accordance with my invention, the beacon equipment is of such a nature as to allow mounting either on land or on a moving ship.

My invention also resides in means to produce transmission from a radio beacon modified so as to constitute a predetermined program.

Another aspect of my invention is characterized by the transmission of radiation periodically in alternate zones or lobes combined with a gradual rotation of the pattern of radiation intensity.

Still another feature of my invention resides in the use of a monitor to control the intensity of the radiated wave and to control the azimuthal orientation of the pattern of radiation intensity.

My invention also resides in features of construction, combination and arrangement herein described or disclosed.

Referring to the drawings.

Figure 1:
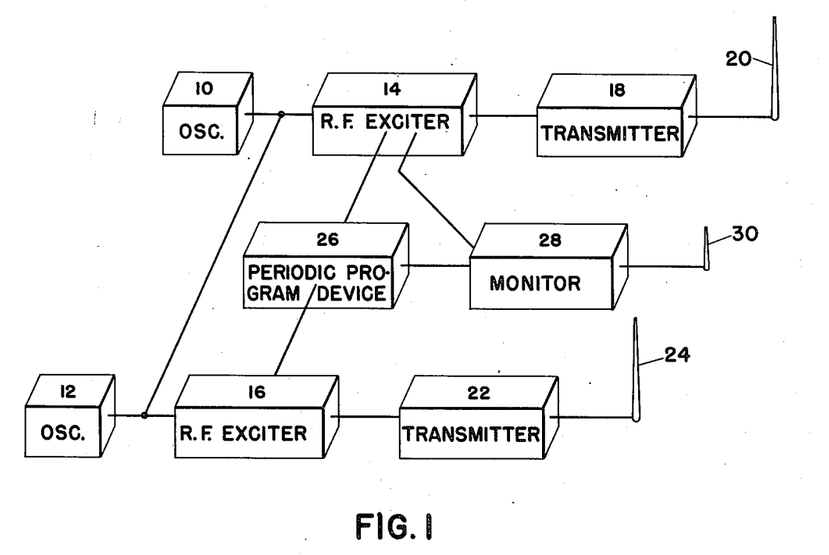
Figure 1 is a block diagram showing the main components and the preferred location of the transmitting antennas relative to the monitor antenna.

Figure 1 shows the preferred form of radiation array consisting of two vertical antennas in spaced relation. These antennas are excited by two transmitters which are in turn excited by a common oscillator. If the spacing of the antennas is of the proper value as described below, the antennas will produce a lobed pattern of radiation intensity, for example, that shown in the solid lines of Figure 3. In practicing my invention the lobed pattern is modified in two ways to provide direction intelligence to a remote receiving station.

The first modification may be termed lobe-switching. To accomplish this the current in one of the antennas is periodically instantaneously reversed in phase. This results in a sudden shifting of the pattern to a new position in which the lobes lie in an intermediate position as shown in the dotted line pattern of Figure 3. The second modification applied to the pattern consists in rotating the pattern gradually in azimuth by progressively changing the phasing of the antenna current in one of the two antennas.

The net effect of the radiation is as follows:

An operator at a receiver located at a remote point will hear a succession of impulses caused by the lobe-switching. After receipt of a certain number of impulses depending upon the azimuthal location of the receiver from the beacon, the operator will receive a steady signal indicating that he is receiving radiation from both sets of lobes. The number of impulses received prior to the receipt of the constant signal may serve as an accurate means for locating the receiving station with respect to the transmitter beacon.

In the foregoing paragraph it has been assumed that the vertical antennas will produce the desired radiation pattern. That such a pattern is produced may be shown with reference to Figure 2. This figure is a plan view showing two vertical transmitting antennas spaced apart by a distance of $2\pi N$ radians where N is an integer. Point P is an arbitrary point of reception located in a plane perpendicular to the two antennas and at an azimuth angle Z from a line of assumed zero azimuth perpendicular to the base line connecting the two antennas. Point P is also assumed to be located at a great distance as compared to the distance between the antennas so that the lines connecting point P with the antennas may be considered parallel.

Figure 2:
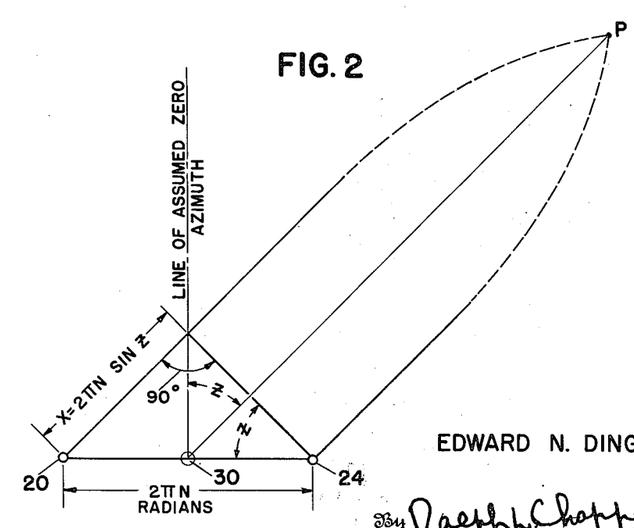
Figure 2 is a plan view showing the geometrical location of a receiving station in relation to the transmitting antennas.

The general expression for the current in the first antenna is $$i_1 = Ae^{j(\omega t + \theta)} \quad (1)$$

The expression for the current in the second antenna which may differ from the first in magnitude and phasing is given by $$i_2 = Be^{j\left(\omega t + \frac{\pi}{2}\right)} \quad (2)$$

In (1) and (2) $i_1$ and $i_2$ are the instantaneous currents in the two antennas respectively. A and B are constants proportional to the peak values of the currents. The letter $e$ is the base of the Naperian logarithms, $\omega$ is the angular velocity and $t$ is the variable time. The symbol $\theta$ represents a variable phase angle between the currents while $\pi_2$ is an angular constant. Upon inspection of Figure 2 it will be seen that the field intensity E at the remote point P due to the combined action of the two antennas is given by $$E = C\left[Ae^{j(\omega t + \theta + x)} + Be^{j\left(\omega t + \frac{\pi}{2}\right)}\right] \quad (3)$$

where C is a constant, from which it is obvious that $$E = C\left[A + B e^{\left(\frac{\pi}{2} - \theta - X\right)}\right] e^{j(\omega t + \theta + X)} \quad (4)$$

or $$E = C\left[A + B\cos\left(\frac{\pi}{2} - \theta - x\right) + Bj\sin\left(\frac{\pi}{2} - \theta - x\right)\right]e^{j(\omega t + \theta + x)} \quad (5)$$

The magnitude M of the intensity without regard for the instantaneous radio frequency phase which is inconsequential in this application is $$M = C\sqrt{\left[A + B\cos\left(\frac{\pi}{2} - \theta - x\right)\right]^2 + \left[B\sin\left(\frac{\pi}{2} - \theta - x\right)\right]^2} \quad (6)$$

which upon simplification becomes $$M = C\sqrt{A^2 + B^2 + 2AB\sin(\theta + x)} \quad (7)$$

Since, from Figure 2

$$x = 2\pi N \sin Z, \quad (8)$$

substitution gives $$M = C\sqrt{(A^2 + B^2) + 2AB\sin(\theta + 2\pi N \sin Z)} \quad (9)$$

The plotting of this function on polar coordinates produces a lobed pattern in which the position of the lobes does not depend on the relative or absolute values of the antenna currents indicated by the magnitudes of A and B nor upon the value of constant C. To simplify plotting therefore we shall assume that the constants A, B and C have values such that $$M_1 = \frac{\left(\frac{M}{C}\right)^2 - A^2 - B^2}{2AB} \quad (10)$$

Thus from Equation 9

$$M_1 = \sin(\theta + 2\pi N \sin Z) \quad (11)$$

Assume the antennas are spaced apart three wavelengths so that $N=3$. Assume further that the transmitted signals are in phase; then $\theta = 0$. A plot of $M_1$ under these conditions is shown in the solid curve of Figure 3. If the signal of the first transmitter is next assumed to be 180° out of phase with the signal of the second, in other words that $\theta = -\pi$, the resulting curve is that indicated by the dotted line.

Figure 3:
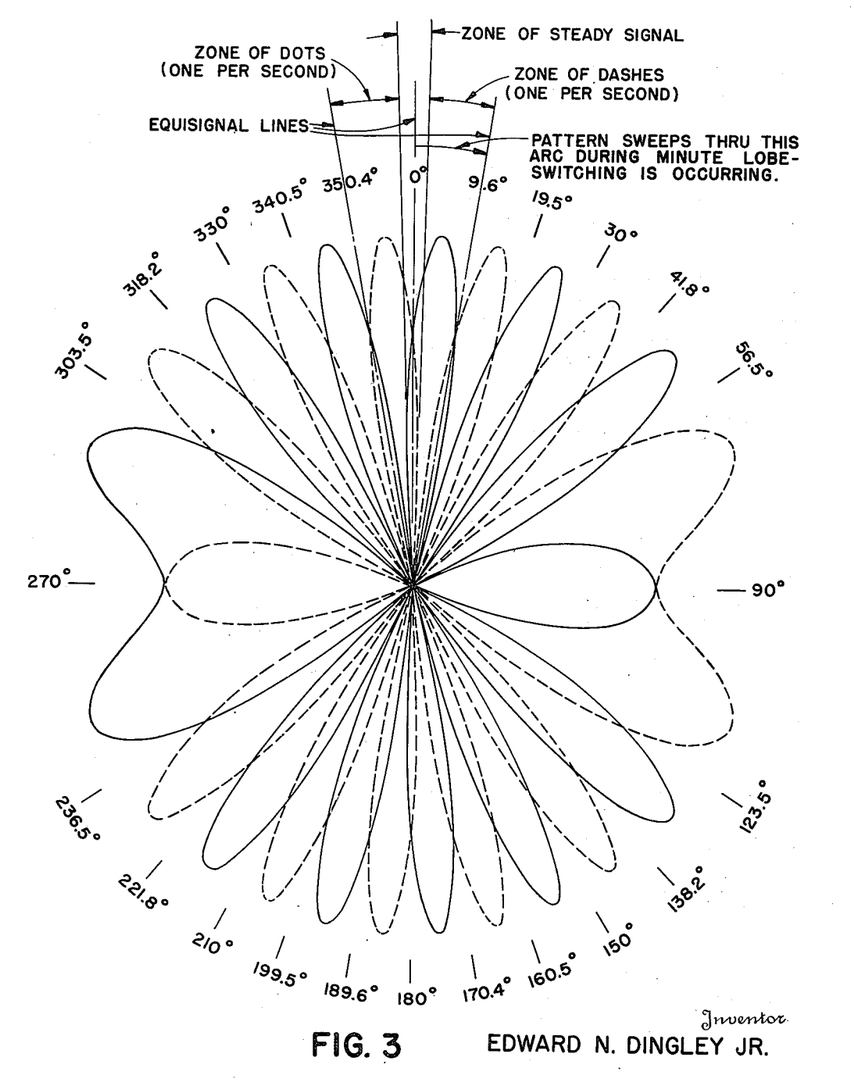
Figure 3 shows the pattern of radiation intensity produced by the antennas associated with the beacon.

It will be noted that the lobes of the two curves overlap producing a zone in which a constant signal is received regardless from which of the two overlapping lobes energy is being transmitted at the time. The radial lines indicating the median of such zones called the "equisignal" or "interlobal" lines exist at values of Z designated $Z_e$ in which $$\sin(\theta + 2\pi N \sin Z_e) = 0 \quad (12)$$

from which $$Z_e = \sin^{-1}\left(\frac{k\pi - \theta}{2\pi N}\right) \quad (13)$$

where K is zero or any integer. If the antennas are spaced apart a distance of $N=3$ wavelengths, equisignal lines will exist at the following values of azimuth:

| | | | |
|---|---|---|---|
| 9.6° | 123.5° | 189.6° | 303.5° |
| 19.5 | 138.2 | 199.5 | 318.2 |
| 30 | 150 | 210 | 330 |
| 41.8 | 160.5 | 221.8 | 340.5 |
| 56.5 | 170.4 | 236.5 | 350.4 |
| 90 | 180 | 270 | 360 |

Equation 13 indicates that the azimuths $Z_e$ of the several equisignal lines is determined by the value of $\theta$ for antennas of a given spacing, and that $Z_e$ may be advanced or retarded by advancing or retarding $\theta$. If $\theta$ is slowly and uniformly retarded from $\theta$ to $-\pi$ during a 60-second period, while simultaneously cyclically reversing or "keying" the phase of the current in one antenna so as to advance it by $\pi$ radians from its instantaneous value for one-quarter second during each one-second period, a receiver on any of those azimuths of Figure 3 represented by the tip of the dotted lobes will receive 30 dots during 30 seconds while the equisignal zone is approaching and will receive 30 dashes in 30 seconds while the equisignal zone is departing. At the end of 60 seconds, both antennas are deenergized to signify the end of the keying cycle. Means to accomplish this will be described below.

It would be desirable to have the overlapping of the normal and alternate lobes (the solid and dotted lobes of Figure 3) small in order that the arrival of the equisignal lines could be noted accurately by a receiving operator. However the arrival of the equisignal line may be found accurately by the following procedure: If the breadth of the equisignal zones is such that a few impulses within the zone cannot be distinguished as either dots or dashes, the receiving operator may add the total number of distinguishable dots to the total number of disinguishable dashes; subtract this total from the total of 60 impulses (dots or dashes) which must have occurred during the keying cycle; and add half the difference to the dots received and half to the dashes received. By this means, he may compute the number of discrete dots and dashes that would have been received had the equisignal zone been of negligible width. If 29 dots, then an equisignal zone and then 29 dashes were received, the receiving operator would determine his position as being in a dot zone, 30 dots clockwise from the equisignal zone. By referring to a table or chart of the radiation pattern, he could deduce that the azimuth from the beacon was one of the following:

| 14.5° | 114° | 184.8° | 311.5° |
| 35.8 | 144.2 | 204.6 | 335.4 |
| 66 | 165.5 | 228.5 | 355.2 |

It will be noted that these azimuths, all of which will satisfy the conditions, are never less than 19.3° apart. Provision is made, at the end of the keying cycle, to radiate for about 52 seconds a signal from only one of the antennas to permit the obtaining of a direction finder bearing on the beacon. This direction finder bearing need be accurate to only 9.6 degrees in order to resolve the ambiguity and determine which of the above listed 12 azimuths is the correct one. If desired, approximate dead reckoning information may be used instead of using a direction finder. It should be noted that if the approximate azimuth is known from dead reckoning or is one determined by the direction finder, further recourse to direction finder bearings is not necessary.

For a given antenna spacing, it will be obvious that a table or chart may be prepared by means of which the number of dots or dashes received prior to the advent of the equisignal line may be converted directly into azimuthal degrees, provided that the approximate azimuth is known. The value of the phase angle $\theta$ existing at the start of the keying cycle may be changed from time to time to provide a secure code by use of the apparatus which will be described below.

For maximum range and accuracy it is of course desirable that the average intensity of radiation be approximately the same for all values of azimuth. Stated another way, it is desirable that there be very little signal fading as the radiation pattern is rotated in azimuth with respect to the receiving station. The azimuthal uniformity of signal intensity of the system which I disclose may be shown by comparing the radiation intensity at the equisignal line with that existing at the tip of the lobes. The signal intensity $M_e$ at the equisignal line may be determined by substituting Equation 12 in Equation 9 to give $$M_e = C\sqrt{A^2 + B^2} \quad (14)$$

The magnitude $M_t$ of the signal at the tips of the lobes, in other words when $$\sin = (\theta + 2\pi N \sin Z) = 0 \quad (15)$$

is obtained by substituting Equation 15 into Equation 9 to give $$M_t = C\sqrt{(A^2 + B^2) + 2AB} \quad (16)$$

The ratio of the signal strengths $M_e$ and $M_t$ from Equations 14 and 16 and for the normal condition where $A = B$ is $$\frac{M_e}{M_t} = \frac{1}{\sqrt{2}} = .707 \quad (17)$$

This represents a drop in signal strength of only 3 decibels.

The spacing of the antennas has been assumed in the above discussion to be three wavelengths. This results in three normal (solid) lobes and three alternate (dotted) lobes in each quadrant. If greater accuracy is desired the antenna spacing may be increased with a resultant increase in the number of lobes per quadrant. However, it will be obvious that increasing the number of lobes and thus the number of equisignal lines will increase the difficulty of resolving the ambiguity mentioned above. In the preferred embodiment of my invention two antennas are used; however, it will be obvious to one skilled in the art that any number of antennas may be used so long as the desired lobed pattern is produced.

As stated above I accomplish the desirable result embodied in my invention by performing two operations on a lobed pattern of radiation intensity. The first is a 180 degree phrase reversal which may be easily accomplished by operation of a double-pole double-throw switch supplying excitation to either one of the transmitters or its associated antenna. There are several possible ways for producing a comparatively gradual change in phase of antenna current. For example, half of the total power output of a radio transmitter might be fed to the second antenna while the other half of the total power output is fed to the first antenna through a 60-section phase-shifting network, each section of which shifts the phase by 3 degrees. Successive sections might be cumulatively switched in or out of the circuits. Such a method would be cumbersome and would involve the difficulty of maintaining reasonably constant power level regardless of the number of phase-shifting sections in the circuit. Or if desired, half the power from a single transmitter could be fed directly to one of the antennas and the other half to the other antenna through an inductive type goniometer. This method is not recommended in view of the effect of loading on phase displacement as the goniometer is rotated.

A block diagram of main components including antennas is shown in its simplest form in Figure 1. Oscillators 10 and 12 are jointly fed into two radio frequency exciters indicated generally by the numerals 14 and 16. Exciter 14 energizes transmitter 18 and antenna 20 while exciter 16 energizes transmitter 22 and antenna 24. A periodic program device 26 controls the lobe-switching and rotation of the intensity pattern in a predetermined manner to be described. A monitor indicated generally by the numeral 28 is supplied from a monitor antenna 30 placed equidistant from the antennas 20 and 24.

Figure 4:
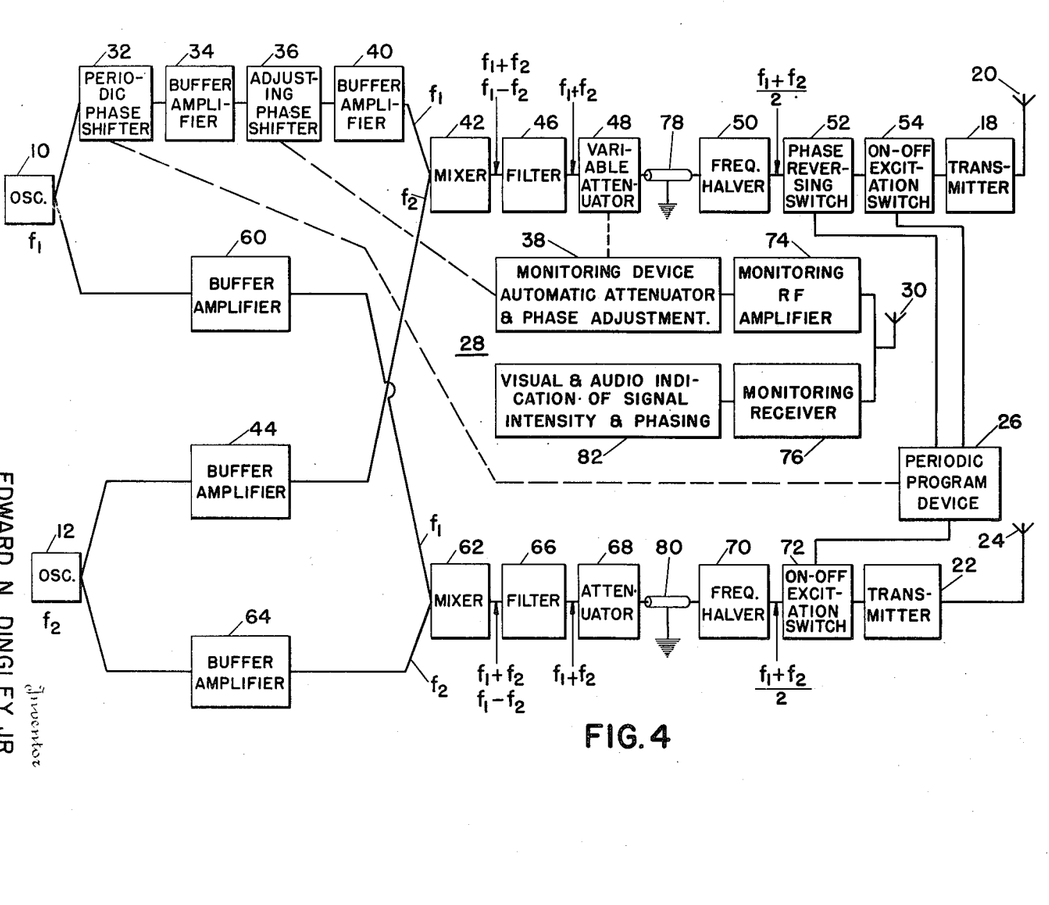
Figure 4 is a block diagram of the beacon and monitor system in greater detail than that shown in Figure 1.

Figure 4 is a more detailed block diagram than Figure 2 showing individual components included in the R. F. exciters and monitor. The oscillator 10 generates oscillations at a frequency $f_1$ while an oscillator 12 operates at a frequency $f_2$. In the preferred embodiment these two frequencies are made approximately equal but they may be different if desired. The output of oscillator 10 is fed into the periodic phase shifter 32 which is mechanically coupled to the periodic program device 26. The output of the phase shifter 32 is fed into a buffer amplifier 34, thence into an adjusting phase shifter 36 which is operatively coupled to the automatic attenuation and phase adjustment portion 38 of the monitor 28. The output of the phase shifter 36 is again amplified by means of buffer amplifier 40 and fed into a mixed 42. The output of the oscillator 12 is amplified by means of the buffer amplifier 44 and also fed into the mixer 42. In the mixer frequencies $f_1$ and $f_2$ are combined to produce two frequencies; one equal to the sum, the other equal to the difference between the input frequencies. The greater of the frequencies only is passed through the filter 46 into a variable attenuator 48 which is mechanically coupled to the automatic attenuation and phase adjustment portion 38 of the monitor 28. After attenuation, the signal is passed through a transmission line 78, thence through the frequency halver 50, the resultant frequency being one-half of the sum of the frequencies generated by the oscillators 10 and 12. The signal now passes through a phase-reversing switch 52 and an "on-off" excitation switch 54 both of which are operatively connected to the program device 26. The resultant signal is fed into the transmitter 18, thence into the radiator 20.

The output of the oscillator 10 is also amplified by means of the buffer amplifier 60 and fed into the mixer 62 where it is combined with the signal generated in the oscillator 12 which has been amplified by the buffer-amplifier 64. As in the previous case the double frequency is selected by means of a filter 66; however, in this case the signal passes through an adjustable attenuator 68. After passing through transmission line 80, the signal is acted upon by the frequency halver 70 and passed through an "on-off" excitation switch 72 which is operatively connected to the program device 26. The resultant signal is fed into the transmitter 22 and is radiated by means of the antenna 24.

Since in the preferred embodiment of my device the frequency halvers 50 and 70 are fed through shielded transmission lines 78 and 80 respectively, all the components shown to the left of the frequency halvers 50 and 70 in Figure 4 may be located remotely from the remainder of the equipment if desired.

The monitor 28 is supplied from monitor antenna 30. The automatic portion of the monitoring equipment consists of a monitoring R. F. amplifier 74 and the automatic attenuation and phase adjustment portion 38. The manual monitoring portion consists of a monitoring receiver 76 provided with visual and audio indicating means 82.

Figure 5:
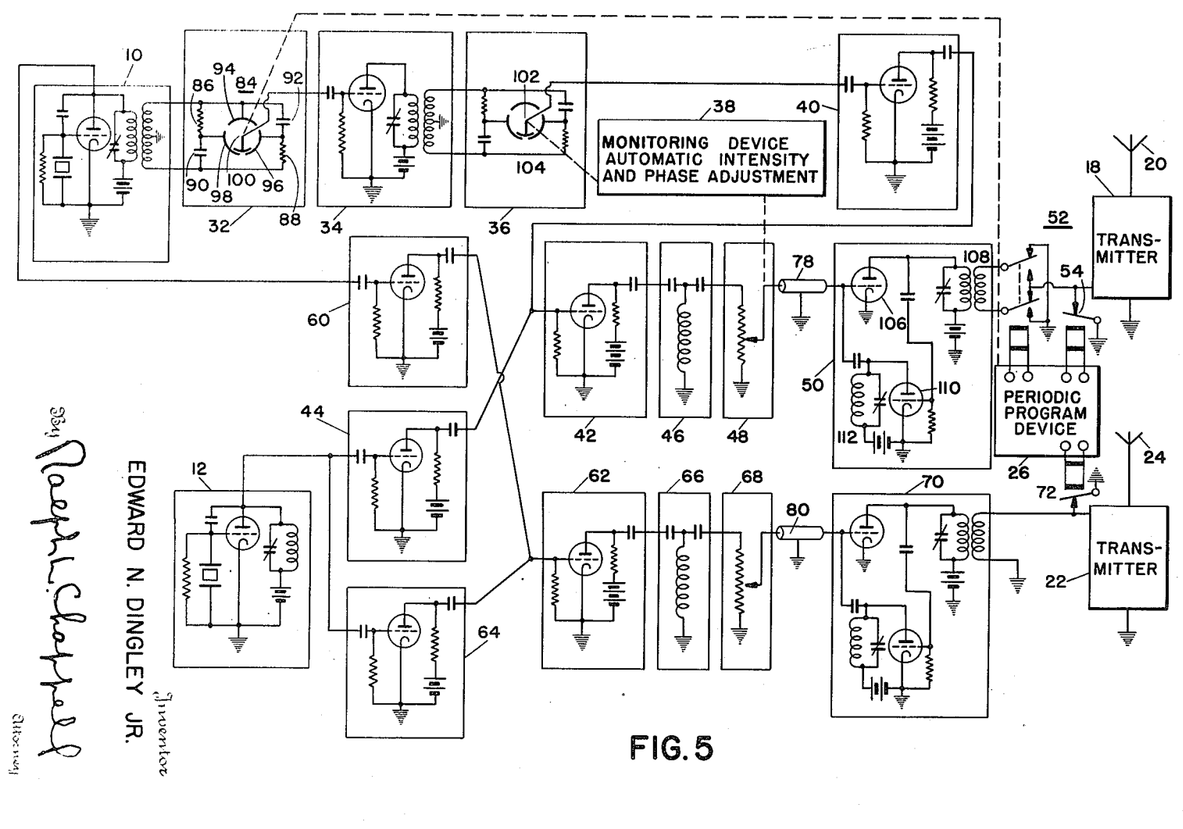
Figure 5 is a simplified schematic diagram of the radio frequency portion of the beacon.

Figure 5 is a schematic circuit diagram of the components shown in block form in Figure 4 except for the monitoring and periodic program devices. Details not necessary to full comprehension by one skilled in the art, such as plate, bias, and filament supplies and by-pass capacitors have been omitted. Furthermore, the circuit of the oscillators, buffer amplifier and the like are not necessarily the most modern or efficient circuits usable for each purpose. The most simple circuits capable of performing the function are depicted to improve diagrammatic simplicity.

The oscillator 10 delivers a radio frequency signal as frequency $f_1$ to a phase shifter 32 of conventional design comprising a capacitor type goniometer 84 also of conventional design. The depicted network of resistors 86 and 88 and capacitors 90 and 92 are so chosen that the potentials applied to the three plates 94, 96 and 98 of the goniometer are equal in magnitude and spaced from each other by 120 electrical degrees in time phase. The rotor 100 of the goniometer supplies a signal of frequency $f_1$, and the phase determined by the position of the goniometer, to the buffer amplifier 34. The rotor 100 of the goniometer is driven by periodic means as will be discussed.

Upon leaving the buffer amplifier 34 the signal passes through the adjusting phase shifter 36 similar to the shifter 32 just described. The rotor 102 of goniometer 104 is adjusted mechanically by the adjustment device 38. The signal next passes through a buffer amplifier 40, the mixer 42, the filter 46, and the attenuator 48, to the frequency halver 50.

The frequency halver 50 is of a conventional design in which the excited signal is fed through the grid of vacuum tube 106 which has a plate tank circuit 108 tuned to one-half of the input frequency. Some of the energy from the tank circuit 108 is fed into the grid of tube 110 which has a plate tank circuit 112 tuned to the third harmonic of the signal impressed on the grid of tube 110. This frequency is also one and one-half times the input frequency. When combined with the input frequency, a frequency difference equal to half the input frequency results which is magnified by the tuned circuit 108 where it is used to reenergize the grid of the tube 110 and to drive the first tube of the transmitter. The frequency halver 70 is identical in construction to that just discussed.

Several important advantages result in halving the frequency. First it permits the controlling signal in the transmission lines 78 and 80 to be at twice the frequency of the transmitted signal thus minimizing feed-back from antennas to transmission lines. Secondly, by halving the frequencies the phase shift produced by the phase-shifting devices 32 and 36 is halved permitting a 360 degree rotation of the goniometer rotors to produce only a 180 degree phase shift of the signal radiated by radiator 20. This minimizes the effect of small departures from linearity of the goniometers 84 and 104. A third advantage is that small changes in the frequencies generated by the oscillators 10 and 12 have only one half the effect on the transmitted wave.

While two oscillators 10 and 12 are shown in the preferred embodiment of my device, it will appear obvious to one skilled in the art that a single oscillator could be used without departing from the teaching of my invention.

Figure 6:
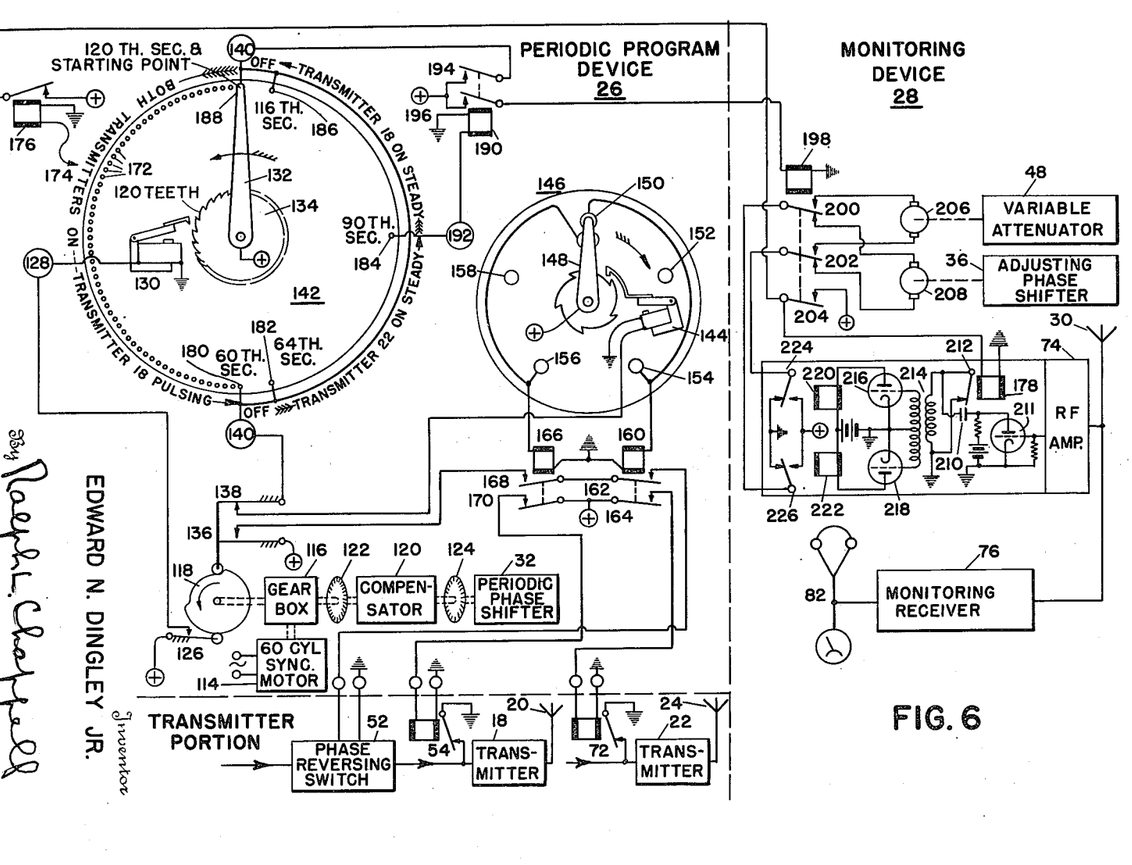
Figure 6 shows the components and electrical connections used to produce a predetermined program of transmitted beacon signals and to monitor the signals in order to adjust the intensity and phasing.

Figure 6 is a more detailed showing of the circuit components and wiring diagram of the periodic program device 26 and the monitoring device 28. The periodic program device 26 accomplishes three main functions: First it operates the phase-reversing switch to cause lobe switching. Secondly, it controls means for gradually rotating the antenna radiation pattern in azimuth. Thirdly, it controls the operation of the automatic monitoring equipment whose function will be discussed.

The periodic program device is operated by means of a driving means 114 preferably consisting of a 60 cycle synchronous motor. By means of gearbox 116, a switch cam 118 is driven at the rate of one revolution per second. Gearbox 116 also drives a shaft which rotates at the rate of one revolution per minute to drive the phase shifter 32 via the compensator 120. Scales 122 and 124 are provided to aid in adjustment of the compensator. The cam 118 drives a cam-operated switch 126 which is open for three-quarters of a second and closed for one-quarter of a second. This switch supplies voltage to terminal 128 supplying the notching electromagnet 130. In order to simplify the wiring diagram, a positive voltage source is indicated by the circled plus sign. The electromagnet 130 is effective to advance a roving contact arm 132 through three degrees during each current impulse by means of a toothed wheel 134 having 120 notches.

Cam 118 is also effective to operate cam switch 136 which is closed for three-quarters of a second and open for one-quarter of a second and cam switch 138 which is open for three-quarters of a second and closed for one-quarter of a second. In the preferred embodiment of my invention, it is advisable to have the cam switches 126, 136, and 138 spaced about the cam 118 in the positions shown. Cam switch 138 receives positive voltage from terminal 140 associated with the tap switch designated generally by the numeral 142. Cam switch 138 supplies power to a notching electromagnet 144 associated with a five-point notching switch indicated generally by the numeral 146. A roving contact 148 applies positive voltage to contacts located in position 150, 152, 154, 156, and 158. A relay 160 having contacts 162 and 164 is energized when the roving contact 148 is in position 150 or 154. A second relay 166 closes contacts 168 and 170 when the roving contact is in position 150 and 156.

Associated with tap switch 142 are a series of 60 contacts 172, to which may be selectively attached a roving contact 174 serving to energize relay 176. This relay is effective to cause operation of a capacitor switching relay 178 for a purpose to be discussed.

As the roving contact 132 is notched by the contacts 172 at the rate of one notch per second, it reaches contact 180 on the 60th second, contact 182 on the 64th second, contact 184 on the 90th second, contact 186 on the 116th second and contact 188 at the end of two minutes to complete the transmission cycle. Each of the contacts 180, 182, 184, 186, and 188 is effective to cause notching of the five-point tap switch 146.

Contact 184 is effective to energize relay 190 through terminal 192. Relay 190 is equipped with a normally open contact 194 and a normally open contact 196. The latter is effective to energize relay 198 controlling contacts 200, 202 and 204. With the contacts 200 and 202 in the upper position, a D. C. motor 206 is effective to drive the variable attenuator 48 while with the contacts in the lower position, another D. C. motor 208 is effective to drive the adjusting phase shifter 36.

The control for the automatic portion of the monitor 28 includes an R. F. amplifier 74 effective to charge the condenser 210. Contacts 212 in the normally-closed position allow the charging current to be shorted directly to ground. With contacts 212 in the open position, charging takes place through the primary of the transformer 214. The secondary of the latter transformer controls tubes 216 and 218 which in turn control relays 220 and 222 respectively. The latter relays are equipped with single pole double throw contacts 224 and 226.

*Operation of the periodic program device*

The operation of the periodic program device to control the functions of lobe-switching and pattern rotation is as follows: With regard to pattern rotation, the rotation of the periodic phase shifter 32 by torque transmitted from motor 114, gearbox 116 and compensator 120, causes a gradual, timed shifting of the radiation pattern in azimuth. Assuming that tap switch 146 is in position 150, relays 166 and 160 will be energized. This results in the closure of contacts 170 and 164 and the energizing of relays 54 and 72 allowing both transmitters to be on the air. Voltage to energize the phase-reversing switch 52 for three-fourths of every second is applied through cam switch 136, contacts 168 of relay 166, and contacts 162 of relay 160. At the end of 60 seconds of such lobe-switching, roving contact 132 makes contact with contact 180, energizing terminal 140 and applying voltage to relay 144 through the cam switch 138. This results in the advancement of roving contact 148 through one-fifth of a revolution. Movement of the contact 148 to position 152 deenergizes relays 166 and 160, removing the excitation from both transmitters.

At the 64th second, voltage is applied to contact 182 which again energizes the electromagnet 144 of tap switch 146 to move the roving contact into contact with terminal 154, thus energizing relay 160 and causing transmission solely by transmitter 22 and radiator 24. This condition exists until the 90th second when roving contact 132 makes contact with terminal 184 causing the energization of relay 190, the application of voltage to terminal 140, and the advancement of the tap switch 146 through another fifth revolution to energize contact 156. This causes the energization of relay 166 and deenergization of relay 160. The closing of contacts 170 of relay 166 results in the energization of relay 54 and transmission by transmitter 18 and radiator 20. Due to the fact that contacts 162 are open at this time, phase-reversing switch 52 will not be periodically operated. Likewise due to the fact that contacts 164 are open, relay 72 will be in the normally-closed position, thus preventing transmission from transmitter 22 and radiator 24. The steady transmission by transmitter 18 will continue until the 116th second when energization of contact 186 will advance tap switch 146 to the position 158, turning off both transmitters for a period of four seconds. Upon contact of roving contact 132 with terminal 188, the stepping relay 144 will advance another fifth of a revolution to position 150, starting the two-minute cycle over again.

*Operation of monitoring portion*

The two things peculiar to the transmitted radiation pattern which must be continually monitored and adjusted are the relative magnitudes of the signals transmitted by the antennas taken individually and the phasing of the currents of the two antennas while lobe-switching is taking place. The monitoring and adjustment can be accomplished by manual means with the aid of the monitoring receiver 76 which may, for example, be provided with an output indicating means 82 which may be an output meter. To accomplish the adjustment of transmitted signal intensity, it is merely necessary to note the signal strength of the transmitter 22 during the period from the 64th to the 90th second and compare it with the signal strength of transmitter 18 which is radiating from the 90th second to the 116th second. Proper adjustment may then be made by means of the variable attenuator 48.

Manual means may also be used to cause an equisignal or interlobal line to pass through the zero azimuth at any point in the lobe-switching cycle; that is, at any time during the first minute of transmission. To facilitate this, the monitor receiving antenna 30 is located equidistant from the radiators 20 and 24, in other words on the line of zero azimuth. The monitor antenna is preferably located at midway between the radiators. The presence of the equisignal line on the zero azimuth is indicated by receipt of a signal of the same signal strength before and after a lobe-switching operation has taken place. If the equisignal line does not cross the line of zero azimuth at the proper instant, this fact may be ascertained from the receipt of a signal of different intensity from the normal than from the alternate lobe. Proper correction can be made by manual adjustment of the phase-shifter 36.

The accuracy with which the position of the equisignal line can be determined by the monitoring equipment is determined by the magnitude of the change of signal strength per unit change of phase angle $\theta$ in the region of the equisignal line. That the accuracy of positioning of the equisignal line is of a high order may be shown as follows: The rate or derivative of signal strength M of Equation 9 with respect to $\theta$ is given by $$\frac{dM}{d\theta} = \frac{C}{2} \frac{2AB \cos(\theta + 2\pi N \sin Z)}{\sqrt{(A^2+B^2) + 2AB \sin(\theta + 2\pi N \sin Z)}} \quad (18)$$

Let the signal strength at the equisignal line be $Me$. Since at the equisignal line $$\sin(\theta + 2\pi N \sin Z) = 0$$

then $$\cos(\theta + 2\pi N \sin Z) = \pm 1 \quad (19)$$

and assuming the usual condition where the signal strengths of the two antennas are equal and $A=B$, then $$\frac{dMe}{d\theta} = \pm \frac{CA}{\sqrt{2}} \text{ units per radian} \quad (20)$$

or $$\frac{dMe}{d\theta} = \pm \frac{CA}{\sqrt{2}(57.3)} \text{ units per degree} \quad (21)$$

As $\theta$ moves through one degree, the signal strength $Me$ received from the normal lobe will increase by the amount $$\frac{dMe}{d\theta}$$

to $$M_e + \frac{dMe}{d\theta} \quad (22)$$

During this change of $\theta$ the signal strength from the alternate lobe will decrease by the same amount to $$M_e - \frac{dMe}{d\theta} \quad (23)$$

If lobe-switching takes place after $\theta$ moves through the assumed one degree, the difference in the magnitude of the intensity from (22) and (23) will be $$2\frac{dMe}{d\theta} \quad (24)$$

This difference expressed as a percentage of the magnitude $Me$ will be $$\frac{2\frac{dMe}{d\theta}(100)}{Me} \quad (25)$$

Substituting the values of $Me$ and $$\frac{dMe}{d\theta}$$

obtained from expressions (14) and (21) respectively and since $A=B$, the percentage difference of signal before and after lobe-switching will be 1.75%. This is an amount easily detectable by the monitor using an ordinary output meter. Actually during the period of one lobe-switching operation, $\theta$ is advanced 3 degrees so that the change in signal strength noted before and after lobe-switching may be as great as three times this value or about 5.25 percent, which is equivalent to .44 decibel.

The rate of change of azimuth angle of the equisignal line per electrical degree change in $\theta$ may be obtained by differentiating (13) to obtain $$\frac{dZ}{d\theta} = \frac{1}{2\pi N \cos Z} \quad (26)$$

Since at the azimuth $Z=0$, $\cos Z=1$, and if $N=3$, as previously assumed, then the azimuth of the equisignal line will change .053/cos Z times as much as $\theta$, or ⅙ of a degree of azimuth per pulse. At the azimuth $Z=60$ degrees the azimuth of the equisignal zone will still change only ⅓ degree per pulse. It is evident that I have proposed an extremely accurate means for bearing determination, since for the greatest share of the total azimuth accuracy on the order of a a sixth to a third of a degree is readily obtainable.

An automatic monitoring and adjustment of signal magnitude and phasing is accomplished by means of the automatic portion of the monitoring device. Adjustment of the relative magnitude of antenna current in the two radiators is accomplished as follows: During the period between the 64th second and the 90th second, transmitter 22 is on the air exclusively. The transmitted signal is picked up by the monitor antenna 30 and is amplified by means of the R. F. amplifier 74 and serves to charge a capacitor 210. As contact 184 on the tap switch 142 is energized, relay 190 closes causing closing of contacts 204 on relay 198 which in turn causes opening of contacts 212 of relay 178. Simultaneously transmitter 22 is switched "off" and transmitter 18 is switched "on" by means previously described. Any change in received signal strength at the monitor antenna 30 causes a change in the voltage appearing across capacitor 210. The resulting change in the charge on this capacitor must flow through the primary of transformer 214 causing the grid of tube 216 or 218 to go slightly positive depending upon the direction of current flow in the primary. This causes closure of contacts 224 or 226 which causes turning of the D. C. motor 206 to drive the variable attenuator 48 in a proper direction to restore balance between the signal strengths. If sufficient correction cannot be made during the first cycle of operation of switch 142, this process will be repeated until full correction or balancing has been accomplished.

Automatic adjustment of phase is accomplished as follows: Roving contact 174 is attached to one of the contacts 172, the point of attachment being determined by the desired instant of time during the first minute of transmission at which it is desired that the equisignal line cross the line of zero azimuth. The point selected becomes the "code of the day" and must be known by all receiving stations before the beacon intelligence can be properly interpreted as a bearing.

Assume, for example, that contact 174 has been attached to the first of contacts 172. Then during the first second of transmission relay 176 will be closed causing energization of relay 178 located in the monitor. Such switching takes place at the instant of lobe-switching so that the difference in signal intensity of the signal received immediately prior to lobe-switching as compared to the signal received immediately subsequent to lobe-switching will be effective to cause a change of voltage on capacitor 210, the closing of relay 220 or 222, and the resultant rotation of motor 208 to drive the adjusting phase shifter 36 in the proper direction to balance the signal strength received from the normal and alternate lobes.

In Figure 6, a compensator 120 is shown connected between the gearbox 116 and the periodic phase shifter 32. This compensator is of a conventional type which is capable of varying in any desired manner the angular relationship between its input and output shafts. Such a compensator is described on page 210 of "Radio Direction Finding," first edition, by D. S. Bond, published by The McGraw-Hill Company, New York. Such compensators may be adjusted at the time that the calibration charts referred to above are prepared. By its use, compensation can be made for mutual coupling between the antennas and non-linearity of phase change of goniometer 84 as compared to the rotation of its driving shaft. By proper adjustment of the compensator, the time of arrival of equisignal lines in the lobe-switching cycle may be caused to coincide with the theoretical calculated value regardless of the azimuth.

Figure 7:
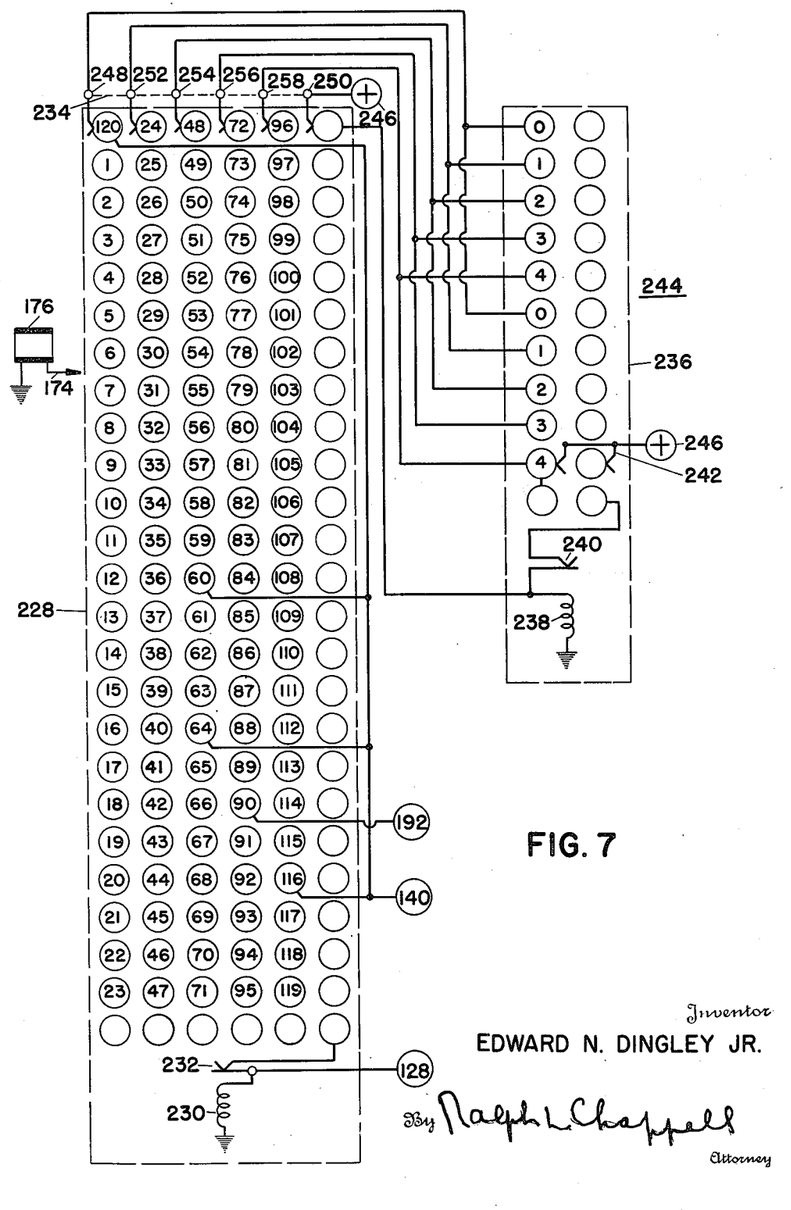
Figure 7 is a wiring diagram showing a method of using standard commercial step-by-step relays for accomplishing the transmission of signals in a predetermined order or program.

The tap switch 142 shown in Figure 6 has been illustrated in a manner to more clearly bring out its operation. If desired, multi-layer telephone stepper switches of the "sunflower" type may be used. In Figure 7 is shown a method of connecting two of such switches to be the operating equivalent of the switch 142 illustrated in Figure 6.

The switch indicated generally by the numeral 228 is a standard six-layer 25-point switch having an operating electromagnet 230 and a normally-closed set of auxiliary contacts 232. The main contacts have been laid out in the drawing in developed relation, their positions numbered for convenience. On the actual switch, they are arranged in a semi-cylindrical bank in a manner well-known to those skilled in the art. The six banks are engaged by a set of six rigidly-connected roving contacts indicated by the numeral 234. A single energization of magnet 230 causes the roving contacts 234 to advance to the next horizontal line of fixed contacts.

A similar switch 236 having an operating coil 238, normally closed auxiliary contacts 240, a pair of roving contacts 242 and having two banks of 11 contacts 244 is also provided. In connecting this combination of switches into the circuits, it is merely necessary to connect three terminals, 128, 140, and 192 to the corresponding terminals in Figure 6 and to apply positive voltage to the terminals 246.

Operation of this switch combination is as follows: Assume that the roving contacts 242 and 234 are initially in the position shown. Applying voltage to terminal 128 causes magnet 230 to step the roving contact downward one row of contacts. Simultaneously, voltage applied through terminals 246 energizes magnet 238 of switch 236 to cause advancement of the roving contacts 242 to position "0" on switch 236. This applies positive voltage from terminals 242 through terminal 248 to position "1" of switch 228. Subsequent energization of the magnet 230 by voltage applied to terminal 128 causes the bank of roving contacts 234 to step successively from position "1" to position "23," and to return to the initial position shown. At such time, roving terminal 250 will apply voltage to magnet 238 of switch 236, causing stepping of the roving contacts 242 to position "1." This operation removes voltage from roving contact 248 and applies voltage to roving contact 252. In like manner, after each 23 impulses voltage is successively applied to roving contacts 254, 256, and 258. Thus there is produced a 120-contact switch which energizes output contacts 140 and 192 in the same order as the tap switch 142 shown in Figure 6.

It will be obvious to one skilled in the art that a "sunflower" switch of the same general type may be used in place of the switch 146 shown in Figure 6.

Various other modifications of the components shown in Figure 6 may be accomplished without departing from the teaching of my invention. For example, the cam 118 may be altered to provide a different ratio of "off" to "on" time. Also, if desired, means may be included for de-coupling the periodic phase shifter 32 to stop rotation in azimuth of the pattern of radiation intensity along any predetermined azimuth so that an equisignal line intercepts a given geographical point. This would enable an air or surface craft to "home" on the beacon station by following the equisignal line characterized by its constant signal. This would be particularly advantageous to enable an aircraft to return to a mother ship on which is mounted a beacon of the type described.

It will also be obvious to one skilled in the art that the location of the contacts on tap switch 142 may be changed to provide a different program of transmission. For example, the length of time that both transmitters are off the air or the length of time that each transmitter is on individually for the use of a conventional type direction finder may be increased or decreased.

A 60-cycle synchronous motor 114 is shown for purposes of driving the cam switch 118 and periodic phase-shifter 32. However, since the cam and periodic phase-shifter are mechanically connected, the number of lobe reversals will always be directly related to the angular displacement of the radiation pattern; thus it is not necessary that the driving means be of exactly predetermined speed. If desired, a shunt wound D. C. motor or any other relatively constant speed driving means may be used.

In order that the information conveyed by the beason described may enable an operator at a distant point to determine his true bearing with respect to the beason, it is necessary that the beacon radiators be oriented in a constant known direction. This condition will be inherently satisfied where the radiators are to be mounted rigidly on land. However, where a beacon of the type described is to be mounted on a moving vessel, it is necessary that the vessel assume a predetermined heading and maintain it during the time that beacon signals are being transmitted. However, it will be obvious to one skilled in the art that an additional compensating goniometer may be included in series with the goniometers 84 and 104 already described to overcome this limitation. Such additional goniometer could be mechanically coupled to the compass repeater to compensate for the deviation of the ship from a heading upon which preparation of the charts used by the receiving station has been based.

Without departing from my teaching as disclosed above, it will appear that a beacon of my design may be operated in a modified manner without destroying its ability to convey bearing information. For example, the periodic phase shifter 32 may be caused to vary the rotation of the antenna pattern in a predetermined manner with true time without reference to the number of phase reversals which may occur. The true time at which an equisignal line is noted at a remote point could obviously be used as a basis for determining bearing information.

While one set of antennas is used to provide two radiation patterns through lobe-switching, it will be obvious to one skilled in the art that two sets of antennas could be used to provide simultaneous transmission in accordance with two radiation patterns, both patterns being rotated in azimuth simultaneously to cause the rotation of equisignal lines. It will appear also that instead of the transmission of an interrupted signal as disclosed, the signal may be emitted constantly and modulated in a distinctive manner so that two adjacent lobes may be distinguished from one another and the equisignal line readily detected.

In the embodiment illustrated the operator begins counting the impulses caused by lobe-switching, using the start of transmission as a starting reference point. It will be obvious to one skilled in the art that any other type of distinctive reference signal may be included at a desired point in the transmitting cycle, for example a short pulse of ICW transmission caused by the temporary insertion of a chopper in the power supply to the transmitters or R. F. amplifiers.

While a simplified stepper switch 146 has been shown in Figure 6, it will appear obvious to one skilled in the art that a sunflower switch of the type discussed in connection with Figure 7 may be readily adapted to accomplish this switching function.

It will be seen from the above that a radio beacon constructed in accordance with my teaching will enable a remote receiving station to accurately determine its azimuthal location with respect to the beacon. It will also be seen that I have provided a program device to insure transmission of signals in a predetermined sequence and automatic monitor adjusting means to insure that the amplitude and phasing of the transmitted signal are kept constantly in adjustment.

While I have shown and described but one embodiment of my invention, it will appear to those skilled in the art that various changes and modifications may be made without departing from my invention and I therefore aim in the attended plan to cover all such changes and modifications as fall within the true scope of my invention.

The invention described herein may be made or used by or for the Government of the United States for governmental purposes without the payment to me of any royalties thereon or therefor.

What I claim is:

1. A radio beacon of the type wherein normal radiation is produced in spaced zones of azimuth, periodic shifting means associated with said beacon acting to rapidly shift said zones of radiation through a predetermined angle of azimuth to an alternate location, said predetermined angle chosen so that said zones overlap to form a line of azimuth along which the signal intensity is the same regardless of whether radiation is taking place in the normal or alternate zones, means associated with said beacon to gradually shift said zones of radiation in azimuth in a predetermined manner with respect to time, whereby the time of arrival of said line of equal signal intensity as noted at a remote receiver may serve as a basis for determining the azimuth of said receiver relative to said beacon.

2. A radio beacon comprising transmitting means, radiating means for said transmitting means, the radiation pattern produced by said radiating means normally directed in predetermined spaced zones in a normal azimuthal position, periodic means for instantaneously shifting the zones of said radiation to an alternate azimuthal position in predetermined angular relation to the zones of normal radiation, said periodic means effective to cause transmission in said zones in normal position to take place in periods of unlike duration as compared to periods of transmission in said zones in said alternate position, means associated with said transmitter to gradually sweep in azimuth said zones of radiation, means associated with said transmitter to cause the transmission of a reference signal when said zones reach a predetermined azimuth orientation, whereby the number of pulses of a given length received subsequent to the reception of said reference signal may serve as a basis for determining the bearing of said transmitter with respect to a receiving station.

3. A radio beacon comprising in combination transmitting means, radiators associated with said transmitting means, the radiation field of said radiators such that normal radiation occurs primarily in predetermined zones spaced in azimuth, first periodic means to instantaneously shift said zones of radiation to an alternate azimuthal position in predetermined angular relation to said normal zones, second periodic means operatively associated with said first periodic means to gradually shift said zones of radiation in azimuth, program means to start transmission of beacon signals when said zones are in predetermined azimuthal orientation whereby the number of operations of said first periodic means from the beginning of transmission may serve as a basis for determining the bearing of said radiators with respect to a receiving station.

4. A radio beacon comprising in combination transmitting means, radiators associated with said transmitting means, said radiators producing a lobed polar radiation pattern of field intensity in a normal orientation with respect to said radiators, periodic switching means associated with said transmitting means to instantaneously shift said radiation pattern to an alternate azimuthal position having lobes lying intermediate the positions occupied by said lobes with said pattern in normal orientation, said normal and alternate lobes in slightly overlapping relation to form equisignal lines, timing means associated with said periodic switching means to form the radiation in the normal and alternate lobes respectively into characteristic pulses of different durations, periodic means to gradually sweep said radiation pattern in azimuth, said timing means also being operatively synchronized with said sweeping means, program means to start transmission of beacon signal when said equisignal lines are in a predetermined azimuthal orientation, whereby the number of pulses of a given characteristic duration received from said start of transmission to the receipt of a signal indicating the presence of an equisignal line may serve as a basis for determining the bearing of said radiators with respect to a receiving station.

5. A radio beacon comprising in combination a transmitter, radiating means producing a lobed polar pattern of field intensity periodic lobe-switching means associated with said radiating means whereby the lobes of said field intensity pattern may be switched from a first position to a second position in which said lobes lie intermediate the azimuthal positions of said first position and in overlapping relation to form equisignal lines, said lobe-switching means producing radiation in pulses of different duration in said respective positions, periodic means to gradually rotate said field intensity pattern, said lobe-switching means being operatively associated with said periodic field-rotating means, program means to start transmission of beacon signals and to transmit a reference signal when said equisignal lines are in a predetermined azimuthal orientation with respect to said radiating means, whereby the number of pulses of a given characteristic duration received from said start of transmission to the receipt of a signal characteristic of an equisignal line may serve as a basis for determining the bearing of said radiating means with respect to a station receiving said beacon signals.

6. A radio beacon comprising transmitting means, radiating means producing radiation in accordance with a first lobed polar pattern of radiation intensity, signal modification means to produce a superimposed lobed pattern of radiation intensity having lobes falling intermediate the lobes of said first pattern, signal identification means associated with said signal modification means wherein the radiation in the two patterns respectively is broken up into a series of pulses of unlike duration, variable phasing means associated with said transmitting and radiating means to cause simultaneous rotation in azimuth of both said radiation patterns, said signal identification means operatively associated with said phasing means, means associated with said transmitting means to produce a reference signal when said radiation patterns are in a predetermined azimuthal orientation whereby the number of pulses of a given characteristic duration received at a remote point after receipt of a reference signal may serve as a basis for determining the bearing of said beacon from said remote point.

7. A radio beacon comprising transmitting means, radiating means producing radiation in accordance with a first lobed polar pattern of radiation intensity, phase reversal means to produce a superimposed lobed pattern of radiation intensity having lobes lying intermediate the lobes of said first pattern, adjacent lobes being of substantially similar shape and maximum intensity, signal identification means associated with said transmitting means causing radiation to occur alternately in accordance with said first pattern and said second pattern respectively and in pulses of unlike duration, variable phasing means causing simultaneous rotation in azimuth of both of said radiation patterns, said signal identification means operatively associated with said phasing means, means associated with said transmitting means to start transmission when said radiation patterns are in a predetermined azimuthal orientation with respect to said radiating means, whereby the number of pulses of a given characteristic duration received at a remote point from the beginning of transmission to the receipt of a substantially constant signal indicating the arrival the interlobal condition may serve as a basis for determining the bearing of said beacon from said remote point.

8. A radio beacon comprising a plurality of spaced radiators, transmitter means to excite said radiators at the same frequency to form a polar radiation intensity pattern having lobes, phase-varying means for gradually varying the phase of the signal transmitted from at least one of said radiators whereby said lobed pattern is caused to rotate in azimuth, periodic means synchronized with said phase varying means for reversing the phase of the signal transmitted from at least one of said radiators for a length of time which is not equal to one half the period of said periodic means thereby causing a sudden shifting of said pattern in azimuth, signal modification means associated with said transmitter means to cause transmission of a reference signal when said pattern is in a predetermined azimuthal orientation with respect to said radiators, said phase-reversing and phase-varying means being operatively associated whereby the number of phase reversals noted between receipt of said reference signal and receipt of a signal indicating an interlobal condition may be utilized to indicate the bearing of said beacon from a receiving station.

9. A radio beacon comprising transmitter means, two radiators normally excited by said transmitter means and so spaced as to provide a first lobed polar pattern of radiation intensity having a plurality of lobes in a ninety degree sector of azimuth, periodic phase-reversing means associated with one of said radiators to produce for an unlike duration as compared to said first pattern a second lobed pattern of radiation intensity having lobes lying intermediate and slightly overlapping the lobes of said first lobed pattern, phase-varying means associated with at least one of said radiators effective to gradually vary the phase of the current in said radiator through a complete reversal to cause a gradual simultaneous rotation of both of said patterns in azimuth, said phase-varying means and phase-reversing means being operatively coupled, means to cause the operation of said phase-reversing means to start with said radiation patterns in a predetermined azimuthal position with respect to said radiators whereby the number and duration of pulses received at a remote receiving station from the start of transmission may serve as a basis for accurate determination of the bearing of said beacon from said receiving station.

10. In an omnidirectional beacon, an oscillator, a cyclic phase shifter connected to respond to said oscillator, an adjustable phase shifter connected to respond to said cyclic phase shifter, phase reversal means connected to said adjustable phase shifter, and a first radiator connected to said phase reversal means; a second radiator spaced from said first radiator connected with said oscillator, said first and second radiators producing a lobed radiation pattern in an azimuthal position dependent upon the phase of said first radiator relative to said second radiator, a monitor antenna equidistant from said first and second radiators, a radio receiver connected with said monitor antenna, program means synchronized with said cyclic phase shifter connected with said phase reversal means to periodically shift the radiation pattern of said spaced first and second radiators to reversed and non-reversed azimuthal patterns for respective periods of unlike duration, said reversed and non-reversed azimuthal patterns being caused to rotate in azimuth by the operation of said cyclic phase shifter, monitor means connected with said radio receiver to detect differences in signal strength received by said monitor antenna, and electromagnetic means connected with said monitor means to operate said adjustable phase shifter so as to equalize the signal strength of the signals received before and after operation of said phase reversal means at a predetermined point determined by said program means in the cyclic variation of said radiation pattern produced by said cyclic phase shifter, whereby the signals radiated by the beacon transmit directional information.

11. In an omnidirectional beacon, an oscillator, a cyclic phase shifter operatively connected to said oscillator, an adjustable phase shifter connected to be energized by said cyclic phase shifter, phase reversing means connected to said adjustable phase shifter, a first radiator operatively connected with said phase reversal means, a second radiator spaced from said first radiator connected with said oscillator, said first and second radiators producing a lobed radiation pattern in an azimuthal position determined by the phase of said first radiator relative to said second radiator, a monitor antenna equidistant from said first and second radiators, and a radio receiver connected with said monitor antenna, monitor means connected with said radio receiver to detect differences in signal strength received by said monitor antenna, program means synchronized with said cyclic phase shifter to cause periodic operation of said phase reversal means to periodically shift said radiation pattern from a non-reversed to a reversed azimuthal position for respective periods of duration, said cyclic phase shifter causing said reversed and non-reversed radiation patterns to cyclically rotate in azimuth, means controlled by said program means to cause said radiators to transmit a reference signal and electromagnetic means connected with said monitor means and controlled by said program means to operate said adjustable phase shifter to equalize the strength of the signals received by said monitor antenna at a predetermined portion of said cyclic variation of the radiation pattern, whereby the transmitted signals contain directional information.

EDWARD N. DINGLEY, Jr.

REFERENCES CITED

The following references are of record in the file of this patent:

UNITED STATES PATENTS

| Number | Name | Date |
|---|---|---|
| 1,934,078 | Ludenia | Nov. 7, 1933 |
| 2,300,581 | Luck | Nov. 1, 1942 |
| 2,376,480 | Green | May 22, 1945 |
| 2,398,335 | Theis | Apr. 9, 1946 |
| 2,406,396 | O'Brien | Aug. 27, 1946 |
| 2,407,324 | O'Brien | Sept. 10, 1946 |
| 2,433,351 | Earp | Dec. 30, 1947 |
| 2,449,174 | O'Brien | Sept. 14, 1948 |

FOREIGN PATENTS

| Number | Country | Date |
|---|---|---|
| 458,734 | Great Britain | Dec. 24, 1936 |

Certificate of Correction

Patent No. 2,510,964                                                   June 13, 1950

EDWARD N. DINGLEY, Jr.

It is hereby certified that error appears in the printed specification of the above numbered patent requiring correction as follows:

Column 4, line 55, for "$\theta$" read $0$; column 5, line 50, after the word "time" insert *to time*; column 6, line 29, for "phrase" read *phase*; column 7, line 9, for "mixed" read *mixer*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*